(12) United States Patent
Pasternack

(10) Patent No.: US 10,867,130 B2
(45) Date of Patent: Dec. 15, 2020

(54) LANGUAGE CLASSIFICATION SYSTEM

(71) Applicant: Microsoft Technology Licensing, LLC, Redmond, WA (US)

(72) Inventor: Jeffrey William Pasternack, Belmont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 37 days.

(21) Appl. No.: 15/994,922

(22) Filed: May 31, 2018

(65) Prior Publication Data

US 2019/0372923 A1 Dec. 5, 2019

(51) Int. Cl.
*G06F 40/263* (2020.01)
*H04L 12/58* (2006.01)
*G06F 3/023* (2006.01)

(52) U.S. Cl.
CPC .......... *G06F 40/263* (2020.01); *G06F 3/0237* (2013.01); *H04L 51/046* (2013.01); *H04L 51/18* (2013.01)

(58) Field of Classification Search
CPC ....... G06F 17/275; G06F 40/263; H04L 51/18
See application file for complete search history.

(56) References Cited

U.S. PATENT DOCUMENTS

| | | | |
|---|---|---|---|
| 9,298,726 B1 * | 3/2016 | Mondal | G06F 16/1752 |
| 9,367,608 B1 | 6/2016 | Zhang | |
| 2006/0106746 A1 * | 5/2006 | Stuhec | G06F 16/258 |
| 2007/0124132 A1 * | 5/2007 | Takeuchi | G06F 17/275 |
| | | | 704/9 |
| 2009/0282114 A1 * | 11/2009 | Feng | G06Q 10/107 |
| | | | 709/206 |
| 2010/0185577 A1 | 7/2010 | Tsaparas et al. | |
| 2010/0287049 A1 * | 11/2010 | Rousso | G06F 16/9535 |
| | | | 705/14.53 |
| 2014/0019117 A1 * | 1/2014 | Ravi | G06F 17/276 |
| | | | 704/9 |

(Continued)

OTHER PUBLICATIONS

"Non Final Office Action Issued in U.S. Appl. No. 15/980,881", dated Feb. 19, 2020, 9 Pages.

(Continued)

*Primary Examiner* — Shaun Roberts
(74) *Attorney, Agent, or Firm* — Schwegman Lundberg & Woessner, P.A.

(57) ABSTRACT

Disclosed are systems, methods, and non-transitory computer-readable media for using a language classification system for generating response messages. A messaging system receives a message transmitted from a first user to a second user, and determines, based on a set of language counter values determined for the second user, a probability value that the second user will respond to the message in a first language and a probability value that the second user will respond to the message in a second language. The language counter values are determined using a text classification model and indicate a number of times that the second user has used the languages in previous messages. Based on the probability values, the messaging system determines that the second user will respond to the message in the first language and causes a set of recommended responses in the first language be presented on the second client device.

14 Claims, 9 Drawing Sheets

(56) References Cited

U.S. PATENT DOCUMENTS

| | | | |
|---|---|---|---|
| 2014/0035823 A1* | 2/2014 | Khoe | G06F 3/02 |
| | | | 345/171 |
| 2014/0039874 A1* | 2/2014 | Pelosi | H04M 1/72552 |
| | | | 704/8 |
| 2016/0110340 A1* | 4/2016 | Bojja | G06F 17/275 |
| | | | 704/9 |
| 2017/0200077 A1 | 7/2017 | Weston et al. | |
| 2018/0095624 A1* | 4/2018 | Osman | H04L 51/043 |
| 2018/0210874 A1* | 7/2018 | Fuxman | G06F 17/2785 |
| 2019/0065458 A1* | 2/2019 | Brunet | G06Q 50/01 |
| 2019/0188277 A1 | 6/2019 | Mansar et al. | |
| 2019/0354586 A1 | 11/2019 | Pastemack | |

OTHER PUBLICATIONS

"Final Office Action Issued in U.S. Appl. No. 15/980,881", dated Jul. 21, 2020, 11 Pages.

* cited by examiner

LANGUAGE CLASSIFICATION SYSTEM

TECHNICAL FIELD

An embodiment of the present subject matter relates generally to message generation and, more specifically, to a language classification system for generating response messages.

BACKGROUND

Digital messaging is rapidly becoming the most common way to quickly communicate with friends and colleagues. For example, messaging applications are commonly used to send and receive messages between individual users and groups of users. While these messaging applications are useful, they still require users to take the time to type responses. Professionals are busy people and do not always have time to craft these responses. There are current systems that provide users with suggested responses; however, these systems have limitations and do not provide personalized messages. For example, some users may speak several languages, and conventional systems are not equipped to properly determine which language to use when providing suggested responses. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
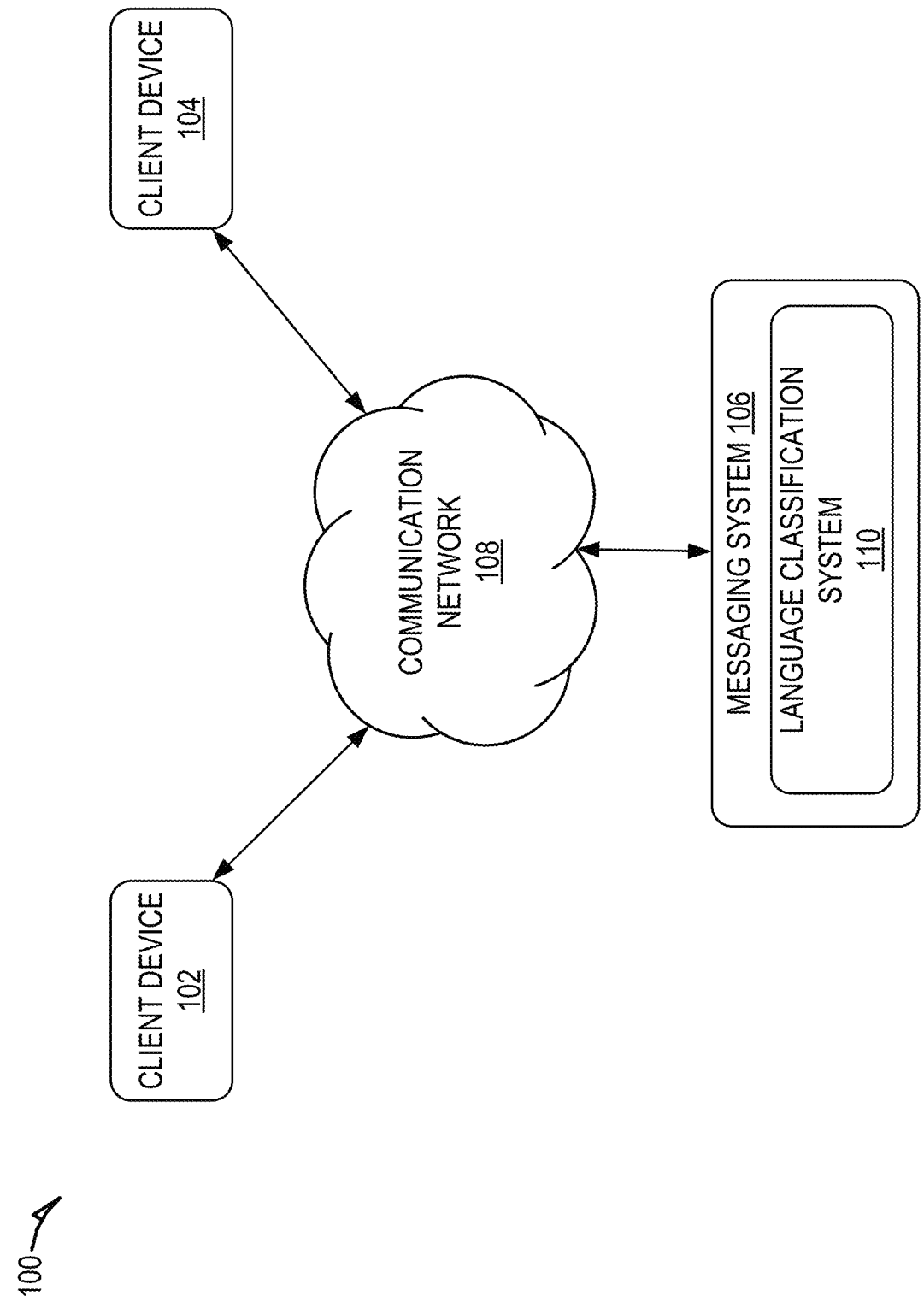
FIG. 1 shows an example system configuration, wherein electronic devices communicate via a network for purposes of exchanging content and other data.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for a language classification system used in generating response messages. A messaging system provides a messaging platform that allows users to initiate communication sessions with one or more other users. The messaging platform provides users with a messaging interface enabling a user to select other users with whom to initiate a communication session, enter messages to be transmitted to the other users in the communication session, and read messages received from the other users in the communication session. The messaging system acts as an intermediary between the users' client devices by, for example, receiving a message that has been sent as part of a communication session from an originating client device, and then transmitting the message to appropriate destination client devices. Hence, users use their client devices to communicate with the messaging system to initiate and/or participate in communication sessions with other users.

To increase the speed at which users generate and transmit responses in a communication session, the messaging system generates recommended responses, which the user can quickly select to respond to the other users of the communication session. In this way, the user can provide a single input (e.g., tapping a recommended response) to provide a response to the other participants of the communication session, rather than typing out a reply message letter by letter and then selecting to send the message. Upon receiving a user selection of one of the recommended responses, the messaging system transmits the recommended response to the other participants of the communication session.

Some users may use speak more than one language, and therefore should be provided with recommended responses in the appropriate language given the communication session. That is, a user should be given recommended responses in the language that the user would use to respond to a received message. Accordingly, the messaging system uses a language classification system that determines which language should be used to generate recommended responses for a user.

The language classification system determines the appropriate language based on historical messages transmitted by the user, as well as demographic data associated with the user. For example, the language classification system uses a text classification model to classify the previous messages transmitted by the user, and uses the resulting classification to determine message based probabilities that the user will respond to a message in various given languages. Similarly, the language classification system uses demographic data associated with a user (e.g., nationality, current address, etc.) to determine profile based probabilities that the user will respond to a message in various given languages. The language classification system users the resulting message based probabilities and profile based probabilities to determine the language that the user is most likely to use in responding to the message.

Once the language classification system determines the appropriate language, the messaging system generates the recommended responses in the determined language based on historical message data transmitted as part of previous communication sessions. The historical message data includes messages that were transmitted between client devices as part of previous communication sessions, as well as an order in which the messages were sent. The messaging system uses the historical message data to generate a statistical model, such as a shallow embedding model, which is used to determine recommended responses based on a received message. For example, upon receiving a message as part of a communication session, the messaging system uses the received message as input in the statistical model, which results in a set of candidate responses to the message. The messaging system then selects a set of recommended responses from the set of candidate responses and provides the set of recommended responses along with the received message to their intended recipient user. The user can then use the provided recommended responses to quickly and easily provide a response to the received message.

FIG. 1 shows an example system 100, wherein electronic devices communicate via a network for purposes of exchanging content and other data. As shown, multiple devices (i.e., client device 102, client device 104, and messaging system 106) are connected to a communication network 108 and configured to communicate with each other through use of the communication network 108. The communication network 108 is any type of network, including a local area network (LAN), such as an intranet, a wide area network (WAN), such as the internet, or any combination thereof. Further, the communication network 108 may be a public network, a private network, or a combination thereof. The communication network 108 is implemented using any number of communications links associated with one or more service providers, including one or more wired communication links, one or more wireless communication links, or any combination thereof. Additionally, the communication network 108 is configured to support the transmission of data formatted using any number of protocols.

Multiple computing devices can be connected to the communication network 108. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 900 shown in FIG. 9.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the system 100, users interact with the messaging system 106 to establish and participate in communication sessions with other users. For example, users use the client devices 102 and 104 that are connected to the communication network 108 by direct and/or indirect communication to communicate with and utilize the functionality of the messaging system 106. Although the shown system 100 includes only two client devices 102, 104, this is only for ease of explanation and is not meant to be limiting. One skilled in the art would appreciate that the system 100 can include any number of client devices 102, 104. Further, the messaging system 106 may concurrently accept connections from and interact with any number of client devices 102, 104. The messaging system 106 supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with the messaging system 106 via a client-side application installed on the client devices 102 and 104. In some embodiments, the client-side application includes a messaging system specific component. For example, the component may be a stand-alone application, one or more application plug-ins, and/or a browser extension. However, the users may also interact with the messaging system 106 via a third-party application, such as a web browser, that resides on the client devices 102 and 104 and is configured to communicate with the messaging system 106. In either case, the client-side application presents a user interface (UI) for the user to interact with the messaging system 106. For example, the user interacts with the messaging system 106 via a client-side application integrated with the file system or via a webpage displayed using a web browser application.

The messaging system 106 is one or more computing devices configured to facilitate and manage communication sessions between various client devices 102, 104. The messaging system 106 can be a standalone system or integrated into other systems or services, such as being integrated into an online service, such as a social networking service, news service, and the like. In either case, the messaging system 106 facilitates a communication session between client devices 102 and 104, where a user participant using one client device 102 can send and receive messages with a user participant using the other client device 104.

The messaging system 106 enables a user to initiate a communication session by providing a messaging interface where the user can select other users to include in the communication session, draft messages to be transmitted to the selected other users as part of a communication session, and read messages received from the other users as part of the communication sessions. Messages transmitted by a user's client device 102 as part of a communication session are received by the messaging system 106, which forwards the message to the recipient user's client device 104. The messaging system 106 can also store the received messages along with metadata describing the messages, such as the time the messages were sent, the originating user of the message, the recipient of the message, and so forth.

In addition to facilitating communication sessions, the messaging system 106 also generates and provides users with recommended responses based on historical message data. The historical message data includes messages that were transmitted between client devices 102, 104 as part of previous communication sessions, as well as an order in which the messages were sent. The messaging system 106 uses the historical message data to generate a statistical model, such as a shallow embedding model, which is used to determine recommended responses based on a received message. For example, upon receiving a message from client device 102 that is intended for client device 104 as part of a communication session, the messaging system 106 uses the received message as input in the statistical model, which results in a set of candidate responses to the message. The messaging system 106 then selects a set of recommended responses from the set of candidate responses and transmits the set of recommended responses along with the received message to client device 104 as part of the communication session. The user of client device 104 can then use the provided recommended responses to quickly and easily provide a response to the received message. For example, the user of client device 104 can provide a single input (e.g., tapping one of the recommended responses) to provide a response to the user of client device 102, rather than typing out a reply message letter by letter and then selecting to send the message. Upon receiving a user selection of one of the recommended responses from client device 104, the messaging system 106 transmits the recommended response to client device 102 as part of the communication session. Additionally, the messaging system 106 may generate and provide client device 102 with a set of recommended responses.

Some users may use speak more than one language, and therefore should be provided with recommended responses in the appropriate language given the communication session in which the user is participating. That is, a user should be given recommended responses in the language that the user would use to respond to a message as part of a communication session. Accordingly, the messaging system 106 includes a language classification system 110 that determines which language should be used to generate recommended responses for a user.

The language classification system 110 determines the appropriate language based on historical messages transmitted by the user, as well as demographic data associated with the user. For example, the language classification system 110 uses a text classification model to classify the previous messages transmitted by the user, and then uses the resulting classification to determine message based probabilities that the user will respond to a message in various given languages. Similarly, the language classification system 110 uses demographic data associated with a user (e.g., nationality, current address, etc.), to determine profile based probabilities that the user will respond to a message in various given languages. The language classification system 110 uses the resulting message based probabilities and profile based probabilities to determine the language that the user is most likely to use in responding to the message.

Once the language classification system 110 determines the appropriate language, the messaging system 106 generates the set of recommended responses in the determined language, and provides the set of recommended responses along with the received message to their intended recipient user. The user can then use the provided recommended responses to quickly and easily provide a response to the received message.

Figure 2:
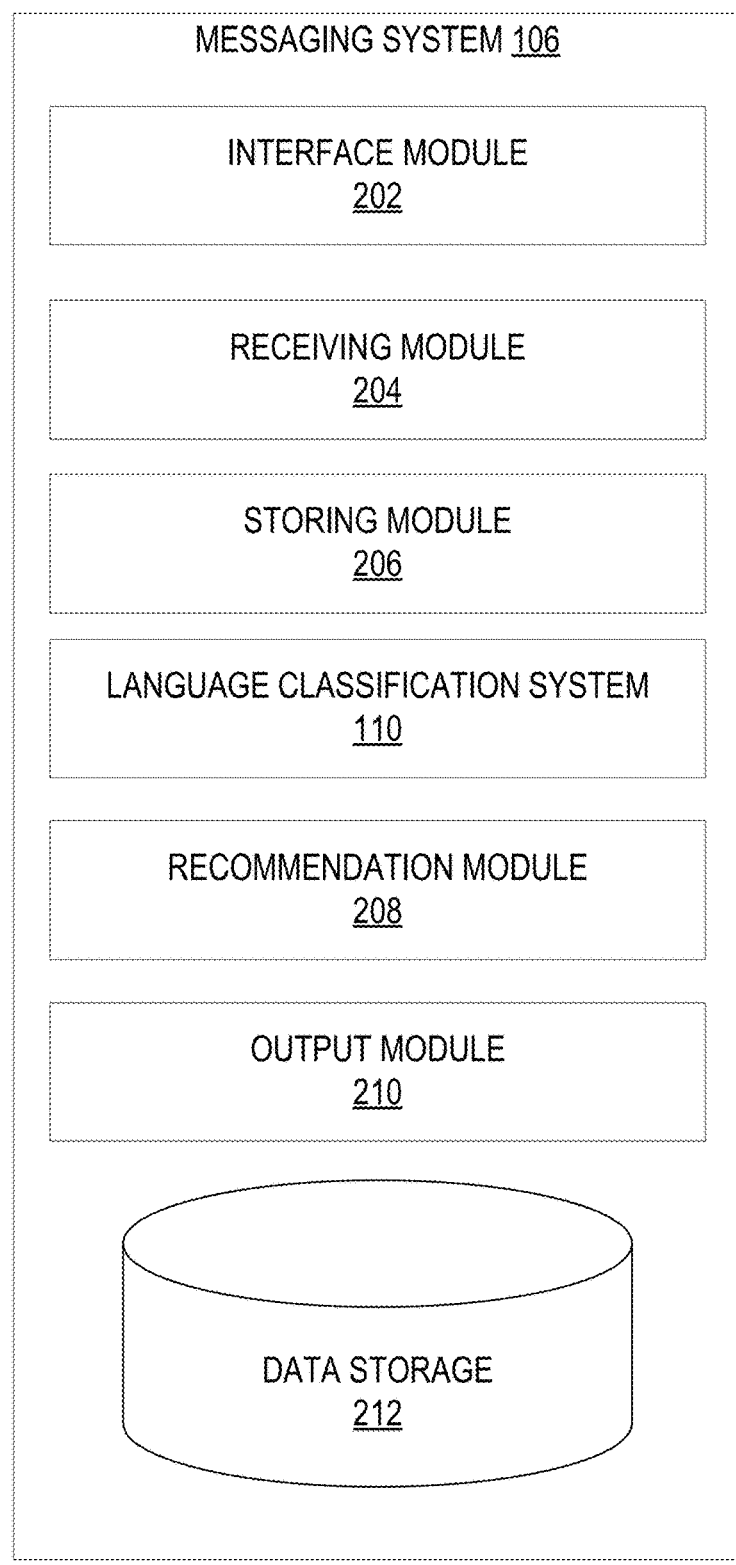
FIG. 2 is a block diagram of the messaging system, according to some example embodiments.

FIG. 2 is a block diagram of the messaging system 106, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the messaging system 106 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the messaging system 106 includes an interface module 202, a receiving module 204, a storing module 206, a language classification system 110, a recommendation module 208, an output module 210, and a data storage 212. The interface module 202 provides a messaging interface that enables users to initiate and participate in communication sessions with other users. For example, the messaging interface includes UI elements (e.g., buttons, scrollbars, text fields, etc.) that enable a user to select users and draft messages to initiate and participate in a communication session. Further, the messaging interface presents the users with a listing of available contacts to include in a communication session. The messaging interface also presents the user with a listing of existing communication sessions, which a user can select from to read the previous messages transmitted as part of the communication session, as well as to draft and send new messages as part of the communication session.

The receiving module 204 receives messages that are being transmitted as part of a communication session. The messages are received from the client device 102, 104 of an originating user and intended for one or more other client devices 102, 104 of recipient users in the communication session. For example, a user may use the client device 102 to generate and transmit a message to the client device 104 of another user as part of a communication session. The message is initially received by the receiving module 204 of the messaging system 106. The received messages may include metadata, such as a timestamp indicating the time at which the message was transmitted, identifiers identifying the source and/or destination client devices 102, 104, identifiers identifying the source and/or destination users, an identifier identifying the communication session, and so forth.

The storing module 206 stores message data consisting of the received messages along with associated metadata in the data storage 212. In some embodiments, the storing module 206 anonymizes the message data to protect the privacy of the users. For example, the storing module 206 removes names and other personal information from the message data. The storing module 206 may also store the message data for a limited period of time, after which the message data is deleted. In some embodiments, a user is allowed to opt in or opt out of having their message data stored by the storing module. Accordingly, users that do not want to have their message data stored can opt out, resulting in the storing module 206 not storing their message data The language classification system 110 determines the appropriate language for recommended responses based on historical messages transmitted by the user, as well as demographic data associated with the user. For example, the language classification system 110 uses a text classification model to classify the previous messages transmitted by the user and uses the resulting classification to determine message based probabilities that the user will respond to a message in various given languages.

The text classification model analyzes text and assigns one or more classification labels to the text that each indicate a potential language of the text, as well as probability values that the given text is in each of the potential languages. For example, the text classification model analyzes a text and assigns an English classification label to the text and a Spanish classification label to the text, indicating that the text is in either English or Spanish. The text classification model further provides a probability value of 75% to the English classification label and a probability value of 25% to Spanish classification label, meaning that the there is a determined 75% chance that the text is in English and a 25% chance that the text is in Spanish.

The language classification system 110 calculates language counter values indicating the number of times each classification label is assigned to previous messages of the user. That is, each language counter value indicates a number of times that the user is determined to have used a specific language in previous messages. As an example, the text classification model analyzes a text and assigns an English classification label to the text and a Spanish classification label to the text. In response, the language classification system 110 increments the language counter value for English and the language counter value for Spanish.

The language classification system 110 increments the language counter value for a classification label based on the probability value assigned to the classification label. For example, a text classification model provides a probability value of 75% to the English classification label and a probability value of 25% to Spanish classification label. In response, the language classification system 110 increments the language counter value for English by 0.75 and increments the language counter value for Spanish by 0.25.

For any given language, the language classification system 110 may maintain multiple language counter values that are based on varying time periods. For example, the language classification system 110 may maintain a long term language counter value that indicates the number of times a user has used a specified language over a relatively longer period of time, such as six months, a year, and the like, as well as a short term language counter that indicates the number of times a user has used a specified language over a relatively shorter period of time, such as one month, two weeks, and the like. The language classification system 110 may also maintain a communication session based language counter that indicates the number of times a user has used a specified language during the course of a communication session.

The language classification system 110 uses the multiple language counter values to calculate message based probability values that the user will respond to a message in given languages. For example, the language classification system 110 uses the language counter values (e.g., short term, long term, and session) for a specified language (e.g., English) to determine a message based probability value indicating the likelihood that the user will respond to the message in the specified language (e.g., English). The language classification system 110 may apply varying weights to the language counter values (e.g., short term, long term, and session) when calculating a message based probability value. For example, the language(s) that the user used most recently (e.g., the short term counter value and/or session counter value) may be given greater weight than languages that the user has not used recently (e.g., long term counter value).

In addition to determining message based probability values that are determined based on previous messages transmitted by the user, the language classification system 110 also determines profile based probability values that a user will respond to a message in a given language. The profile based probability values are determined based on demographic data of the user. Demographic data includes the user's nationality, current address, default location, educational history, languages spoken by the user's connections, and the like. The language classification system 110 gathers the demographic data for the user from a user profile of the user stored in the data storage 212.

The language classification system 110 uses the message based probability values and profile based probability values to determine an overall probability value that the user will use a given language to respond to a message. The language classification system 110 uses the calculated overall probability values to determine the language the user is most likely to use to respond to the message. That is, the language classification system 110 determines the language with the highest overall probability value. The functionality of the language classification system 110 is described in greater detail in relation to FIG. 3.

The recommendation module 208 generates recommended responses in the language determined by the language classification system 110. The recommendation module 208 determines a set of recommended responses based on a received message, the historical message data stored in the data storage 212, user profile data, and/or contextual data. As explained above, the historical message data stored in the data storage 212 includes messages that were transmitted between client devices 102, 104 as part of previous communication sessions, as well as metadata describing the messages, such as the order in which the messages were sent, the originating and destination client devices, and so forth. The recommendation module 208 uses the historical message data to generate a statistical model, such as a shallow embedding model, which is used to determine recommended responses based on a received message. For example, upon receiving a message from client device 102 that is intended for client device 104 as part of a communication session, the recommendation module 208 uses the received message as input in the statistical model, which results in a set of candidate responses to the message. The recommendation module 208 then selects a set of recommended responses from the filtered set of candidate responses, which can be provided to a user. The functionality of the recommendation module 208 is discussed in greater detail below in relation to FIG. 4.

The output module 210 transmits received messages and a set of recommended responses to a recipient user's client device (e.g., client device 104) as part of a communication session. The recipient user can use their client device (e.g., client device 104) to select a recommended response to quickly and easily respond to the received message. For example, the user of client device 104 can provide a single input (e.g., tapping one of the recommended responses) to provide a response to the user of client device 102, rather than typing out a reply message letter by letter and then selecting to send the message. As described above, the messaging system 106, upon receiving a user selection of one of the recommended responses from client device 104, transmits the recommended response to client device 102 as part of the communication session. Additionally, the recommendation module may generate and provide client device 102 with a set of recommended responses.

Figure 3:
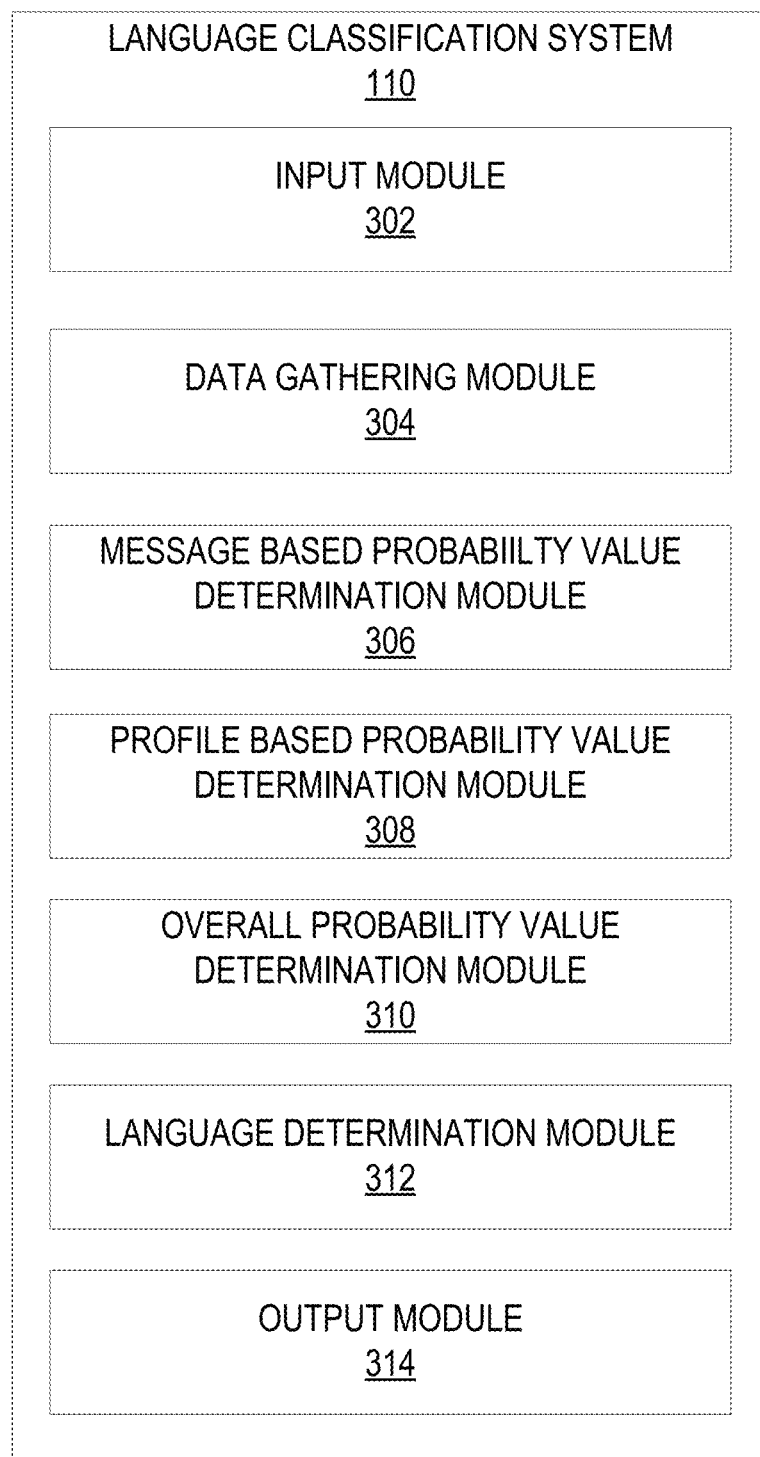
FIG. 3 is a block diagram of the language classification system, according to some example embodiments.

FIG. 3 is a block diagram of the language classification system 110, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the language classification system 110 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the language classification system 110 includes an input module 302, a data gathering module 304, a message based probability value determination module 306, a profile based probability value determination module 308, an overall probability value determination module 310, a language determination module 312, and an output module 314.

The input module 302 receives a request to determine the language that a user is likely to use. The request may include data that is used by the language classification system 110 for determining the appropriate language. For example, the request includes a user identifier that identifies the user, as well as a client identifier that identifies the user's client device 102. The input module 302 provides the received data to the other modules of the language classification system 110.

The data gathering module 304 gathers data to determine an appropriate language for the user. For example, the data gathering module 304 uses the user identifier received by the input module 302 to access the user's profile in the data storage 212. The user's profile maintains demographic data associated with the user, such as the user's nationality, current address, default location, educational history, languages spoken by the user's connections, and the like. The user's profile further includes historical messages authored by the user. This includes messages transmitted as part of communication sessions, as well as other text authored by the user, such as comments, articles, posts, and the like.

The historical message data may include duplicate messages authored by a user. For example, messages transmitted via one communication channel may be automatically duplicated on other communication channels, based on the user's selected settings. Accordingly, the data gathering module 304 filters the gathered historical message data to remove duplicate messages. For example, the data gathering module 304 uses a bloom filter to identify and remove duplicate messages. The data gathering module 304 provides the gathered data (i.e., demographic data and de-duplicated historical message data) to the other modules of the language classification system 110.

The message based probability value determination module 306 determines message based probability values based on the historical message data for the user. A message based probability value indicates the likelihood that a user will respond in a specified language, as determined based on the previous messages authored by the user. The message based probability value determination module 306 uses a text classification model to analyze previous messages authored by the user and determine the language that was used in the previous messages. Some language is inherently ambiguous and therefore it is difficult to definitively determine which language is being used. This is particularly true in short messages in which users use abbreviations. For example, the text "y" may be an abbreviation for the English word "and" or may be the Spanish word for "the." Using a text classification model to analyze previous messages of the user provides a more accurate estimation of the language used by the user, rather than relying on a small portion of messages.

The text classification model analyzes text and assigns one or more classification labels to the text that each indicate a potential language of the text, as well as probability values that the given text is in each of the potential languages. For example, the text classification model analyzes a text and assigns an English classification label to the text and a Spanish classification label to the text, indicating that the text is in either English or Spanish. The text classification model further provides a probability value of 75% to the English classification label, and a probability value of 25% to Spanish classification label, meaning that the there is a determined 75% chance that the text is in English and a 25% chance that the text is in Spanish.

The message based probability value determination module 306 calculates language counter values indicating the number of times each classification label is assigned to previous messages of the user. That is, each language counter value indicates a number of times that the user is determined to have used a specific language in the previous messages. As an example, the text classification model analyzes a text and assigns an English classification label to the text and a Spanish classification label to the text. In response, the message based probability value determination module 306 increments the language counter value for Spanish and the language counter value for English.

The message based probability value determination module 306 increments the language counter value for a classification label based on the probability value assigned to the classification label. For example, text classification model provides a probability value of 75% to the English classification label and a probability value of 25% to Spanish classification label. In response, the message based probability value determination module 306 increments the language counter value for English by 0.75 and increments the language counter value for Spanish by 0.25.

The message based probability value determination module 306 may maintain multiple language counter values for any given language that are based on varying time periods. For example, the message based probability value determination module 306 may maintain a long term language counter value that indicates the number of times a user has used a specified language over a relatively longer period of time, such as six months, a year, and the like, as well as a short term language counter that indicates the number of times a user has used a specified language over a relatively shorter period of time, such as one month, two weeks, and the like. The message based probability value determination module 306 may also maintain a communication session based language counter that indicates the number of times a user has used a specified language during the course of a communication session.

The message based probability value determination module 306 uses the multiple language counter values to calculate message based probability values that the user will respond to a message in given languages. For example, the message based probability value determination module 306 uses the language counter values (e.g., short term, long term, and session) for a specified language (e.g., English) to determine a message based probability value indicating the likelihood that the user will respond to the message in the specified language (e.g., English). The message based probability value determination module 306 may apply varying weights to the language counter values (e.g., short term, long term, and session) when calculating a message based probability value. For example, the language(s) that the user used most recently (e.g., the short term counter value and/or session counter value) may be given greater weight than languages that the user has not used recently (e.g., long term counter value).

The profile based probability value determination module 308 determines profile based probability values that a user will respond to a message in a given language. The profile based probability values are determined based on demographic data of the user. Demographic data includes the user's nationality, current address, default location, educational history, languages spoken by the user's connections, and the like. The profile based probability value determination module 308 determines the profile based probability values using any known method. For example, the profile based probability value determination module 308 may use an extant language classifier, such as Bling or BasisTech.

The overall probability value determination module 310 determines overall probability values that a user will use a language based on the message based probability values and the profile based probability values. For example, to determine the overall probability value that a user will respond to a message in a specific language (e.g., P(English)), the overall probability value determination module 310 multiplies the message based probability value that user will respond in the specified language (e.g., P(English|messages)) by the profile based probability value that user will respond in the specified language (e.g., P(English profile)). The overall probability value determination module 310 performs this operation for each potential language, resulting in a set of overall probability values that the user will respond in each of the potential languages.

The language determination module 312 determines the language for generating recommended responses based on the overall probability values calculated by the overall probability value determination module 310. For example, the language determination module 312 compares the overall probability values and selects the language that has the highest overall probability value. As another example, the language determination module 312 may choose multiple languages when each has a probability value over a specified threshold. In this type of situation, the user may be presented with recommended responses in multiple languages.

The output module 314 outputs the selected language to the recommendation module 208 for use in selected a set of recommended responses.

Figure 4:
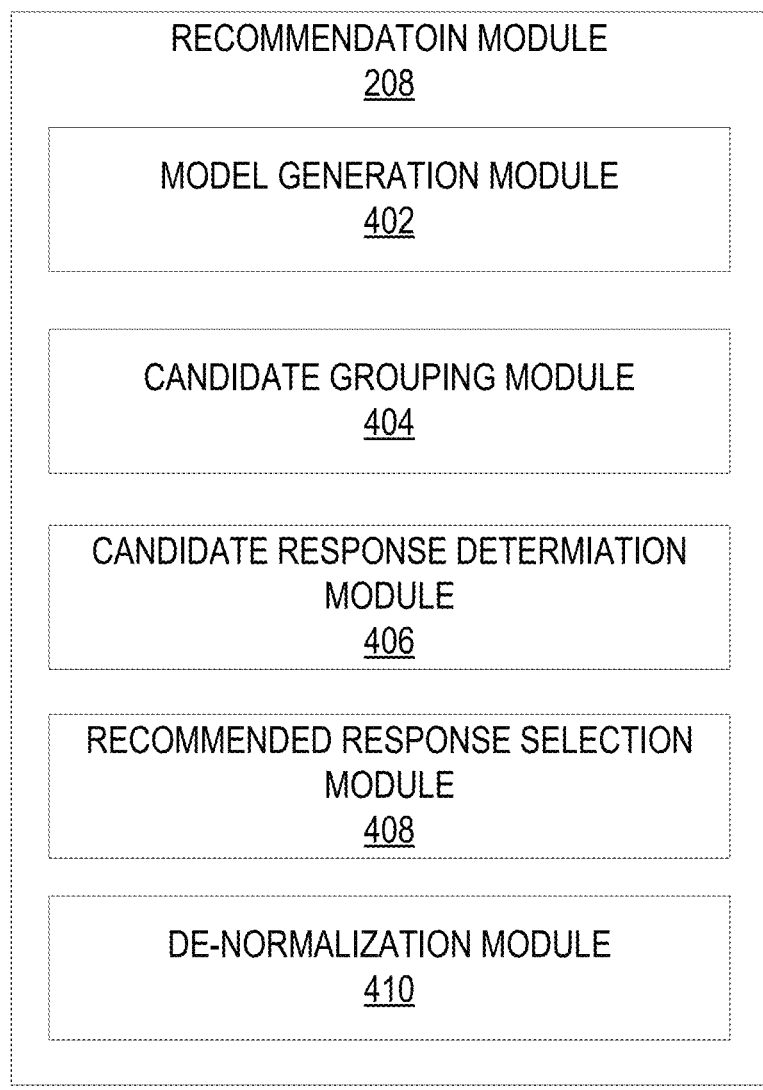
FIG. 4 is a block diagram of the recommendation module, according to some example embodiments.

FIG. 4 is a block diagram of the recommendation module 208, according to some example embodiments. To avoid obscuring the inventive subject matter with unnecessary detail, various functional components (e.g., modules) that are not germane to conveying an understanding of the inventive subject matter have been omitted from FIG. 4. However, a skilled artisan will readily recognize that various additional functional components may be supported by the recommendation module 208 to facilitate additional functionality that is not specifically described herein. Furthermore, the various functional modules depicted in FIG. 4 may reside on a single computing device or may be distributed across several computing devices in various arrangements such as those used in cloud-based architectures.

As shown, the recommendation module 208 includes a model generation module 402, a candidate grouping module 404, a candidate response determination module 406, a recommended response selection module 408, and a de-normalization module 410.

The model generation module 402 generates a statistical model (e.g., a shallow embedding model) based on historical message data stored in the data storage 212. The statistical model receives, as input, a message transmitted as part of a communication session, and returns a set of candidate responses that are commonly used in response to the message.

To generate the statistical model, the model generation module 402 gathers the historical message data from the data storage 212 and identifies the previous messages transmitted during previous communication sessions. The model generation module 402 normalizes each of the previous messages by, for example, replacing personalized terms (e.g., names, addresses, etc.) with placeholders, removing or normalizing punctuation, and so forth. Normalizing the data in this manner allows the model generation module 402 to identify multiple instances of a unique message. For example, the message "Hi Bob" and "Hi Frank" would both be normalized to "Hi [First Name]," which the model generation module 402 will identify as being two instances of the same message.

After the messages have been normalized, the model generation module 402 identifies a set of the normalized messages that occurred at least a threshold number of times. This provides the model generation module 402 with commonly used responses, which the model generation module 402 designates as a set of available candidate responses that the model generation module 402 can choose from to provide recommended responses to users. To determine the proper context in which to recommend the candidate responses, the model generation module 402 identifies, from the historical message data, messages that preceded each instance of the candidate responses. The model generation module 402 uses these preceding messages along with their corresponding responses to generate the statistical model.

The resulting statistical model returns a set of candidate responses from the available candidate responses based on a provided message input. The set of candidate responses is a subset of the available candidate responses that are determined to be commonly used in responses that are the same or similar to the input message.

The candidate grouping module 404 groups similar candidate responses into candidate groups. Multiple candidate responses may have similar meanings. For example, the terms 'yes,' 'yeah,' 'yup,' 'sure,' and the like, all have essentially the same meaning. Providing a user with multiple recommended responses with similar meanings may be redundant and provide the user with limited response options. Accordingly, it is preferable to provide the user with recommended responses that have a variety of meanings. For example, providing the user with recommended responses 'yes,' 'maybe,' and 'no' provides the user with three options that each have a distinct meaning from the others, whereas the recommended responses 'yes,' 'yup,' and 'sure' provide the user with three options that all have a single meaning. To this end, the candidate grouping module 404 groups each of the candidate response from the available candidate responses into a candidate group based on the meaning of the candidate response. As a result, each candidate response is included in a candidate group with a similar meaning.

The candidate response determination module 406 determines a set of candidate responses based on a received message. The received message is a message received as part of a communication session. To accomplish this, the candidate response determination module 406 uses the received message as input in the statistical model generated by the model generation module 402. As explained above, the statistical model returns a set of candidate responses that are commonly used in response to a received message. The set of candidate responses are a subset of the available candidate responses. In some embodiments, the set of candidate responses returned by the statistical model are ranked based on how likely or commonly each candidate response is used in response to the input message.

The recommended response selection module 408 selects a set of recommended responses from the set of candidate responses based on a set of candidate selection rules. The set of candidate selection rules dictates how the set of recommended responses should be selected from the set of candidate responses. For example, the set of candidate selection rules may dictate the number of candidate responses that should be selected as recommended responses, such as 3 candidate responses. As another example, the set of candidate selection rules may dictate that the top rated candidate selection rules be selected. As a further example, the set of candidate selection rules may dictate a maximum limit on the number of candidate response that can be selected from a candidate group. For example, the candidate selection rules may dictate that only one candidate response can be selected from each candidate group. This type of candidate selection rule ensures that a user is provided with recommended responses with a variety of meanings. In some embodiments, the candidate selection rules can dictate a minimum number of candidate groups from which a candidate response should be picked, such as at least two candidate groups. As a result, the recommended responses provided to the user will include at least two responses with different meanings.

The de-normalization module 410 de-normalizes recommended responses prior to the recommended response being provided to the user. De-normalizing a recommended response includes replacing a placeholder included in the recommended response with personalized data. For example, a placeholder such as [first name] can be replaced with the recipient user's first name. As another example a placeholder such as [date] can be replaced with the current date. As a result, the recommended messages provided to the user will be personalized based on the communication session and current context (e.g., date, time, etc.).

Figure 5:
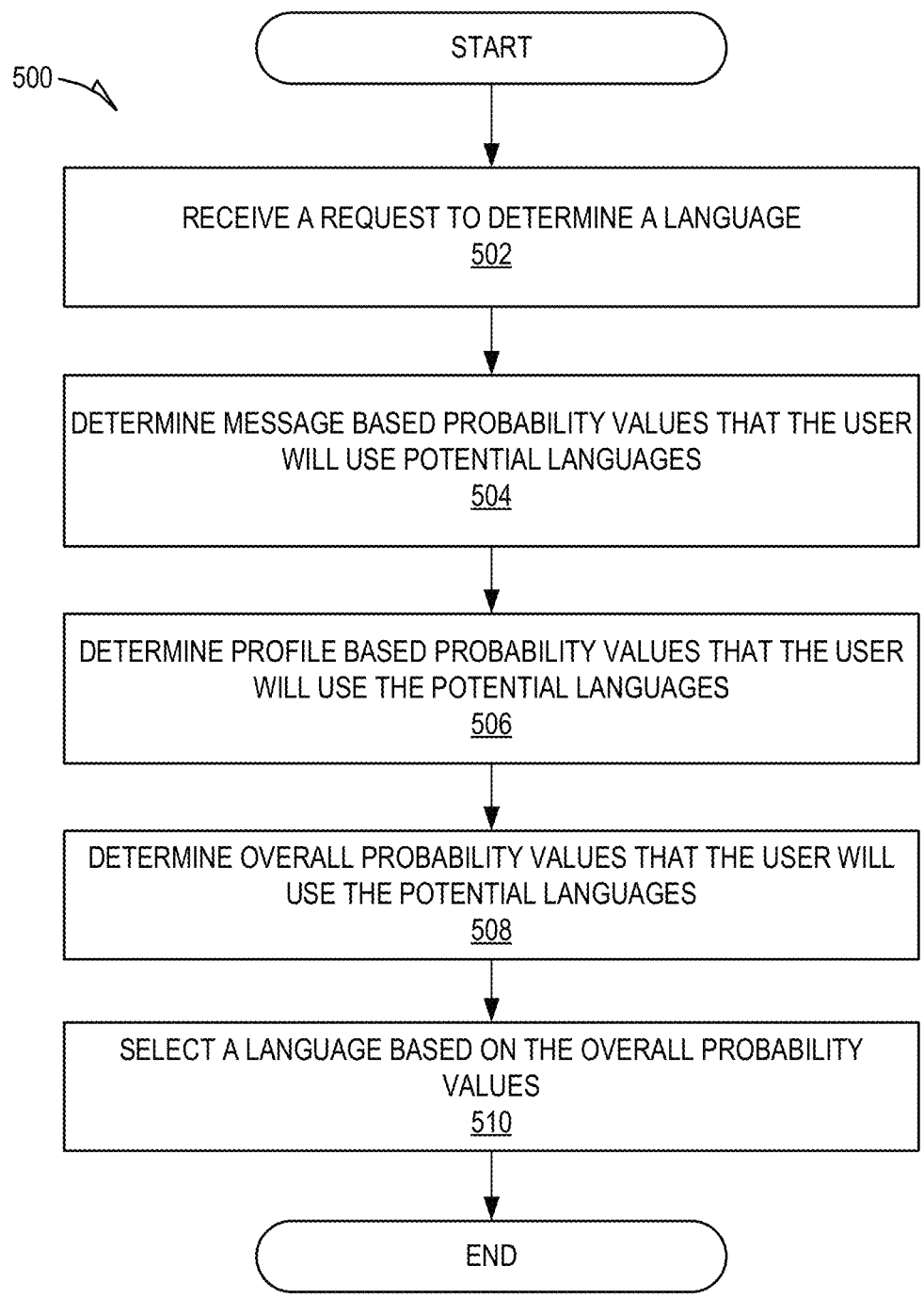
FIG. 5 is a flowchart showing an example method of using a language classification system for generating response messages, according to certain example embodiments.

FIG. 5 is a flowchart showing an example method 500 of using a language classification system for generating response messages, according to certain example embodiments. The method 500 may be embodied in computer readable instructions for execution by one or more processors such that the operations of the method 500 may be performed in part or in whole by the language classification system 110; accordingly, the method 500 is described below by way of example with reference thereto. However, it shall be appreciated that at least some of the operations of the method 500 may be deployed on various other hardware configurations and the method 500 is not intended to be limited to the language classification system 110.

At operation 502, the input module 302 receives a request to determine a language that a user is likely to use. For example, the request may be to determine the language the user is likely to use to respond to a received message. The request may include data that is used by the language classification system 110 for determining the appropriate language. For example, the request includes a user identifier that identifies the user, as well as a client identifier that identifies the user's client device 102. The input module 302 provides the received data to the other modules of the language classification system 110.

At operation 504, the message based probability value determination module 306 determines message based probability values that the user will use potential languages. The message based probability value determination module 306 determines message based probability values based on the historical message data for the user. A message based probability value indicates the likelihood that a user will respond in a specified language, as determined based on the previous messages authored by the user. The message based probability value determination module 306 uses a text classification model to analyze previous messages authored by the user and determine the language that was used in the previous messages. Some language is inherently ambiguous and therefore it is difficult to definitively determine which language is being used. This is particularly true in short messages in which users use abbreviations. For example, the text "y" may be an abbreviation for the English word "and" or may be the Spanish word for "the." Using a text classification model to analyze previous messages of the user provides a more accurate estimation of the language used by the user, rather than relying on a small portion of messages.

The text classification model analyzes text and assigns one or more classification labels to the text that each indicate a potential language of the text, as well as probability values that the given text is in each of the potential languages. For example, the text classification model analyzes a text and assigns an English classification label to the text and a Spanish classification label to the text, indicating that the text is in either English or Spanish. The text classification model further provides a probability value of 75% to the English classification label, and a probability value of 25% to Spanish classification label, meaning that the there is a determined 75% chance that the text is in English and a 25% chance that the text is in Spanish.

The message based probability value determination module 306 calculates language counter values indicating the number of times each classification label is assigned to previous messages of the user. That is, each language counter value indicates a number of times that the user is determined to have used a specific language in the previous messages. As an example, the text classification model analyzes a text and assigns an English classification label to the text and a Spanish classification label to the text. In response, the message based probability value determination module 306 increments the language counter value for Spanish and the language counter value for English.

The message based probability value determination module 306 increments the language counter value for a classification label based on the probability value assigned to the classification label. For example, text classification model provides a probability value of 75% to the English classification label and a probability value of 25% to Spanish classification label. In response, the message based probability value determination module 306 increments the language counter value for English by 0.75 and increments the language counter value for Spanish by 0.25.

The message based probability value determination module 306 may maintain multiple language counter values for any given language that are based on varying time periods. For example, the message based probability value determination module 306 may maintain a long term language counter value that indicates the number of times a user has used a specified language over a relatively longer period of time, such as six months, a year, and the like, as well as a short term language counter that indicates the number of times a user has used a specified language over a relatively shorter period of time, such as one month, two weeks, and the like. The message based probability value determination module 306 may also maintain a communication session based language counter that indicates the number of times a user has used a specified language during the course of a communication session.

The message based probability value determination module 306 uses the multiple language counter values to calculate message based probability values that the user will respond to a message in given languages. For example, the message based probability value determination module 306 uses the language counter values (e.g., short term, long term, and session) for a specified language (e.g., English) to determine a message based probability value indicating the likelihood that the user will respond to the message in the specified language (e.g., English). The message based probability value determination module 306 may apply varying weights to the language counter values (e.g., short term, long term, and session) when calculating a message based probability value. For example, the language(s) that the user used most recently (e.g., the short term counter value and/or session counter value) may be given greater weight than languages that the user has not used recently (e.g., long term counter value).

At operation 506, the profile based probability value determination module 308 determines profile based probabilities that the user will use the potential languages. The profile based probability value are determined based on demographic data of the user. Demographic data includes the user's nationality, current address, default location, educational history, languages spoken by the user's connections, and the like. The profile based probability value determination module 308 determines the profile based probability values using any known method. For example, the profile based probability value determination module 308 may use an extant language classifier, such as Bling or BasisTech.

At operation 508, the overall probability value determination module 310 determines overall probabilities that the user will use the potential languages. The overall probability value determination module 310 determines overall probability values that a user will use a language based on the message based probability values and the profile based probability values. For example, to determine the overall probability value that a user will respond to a message in a specific language (e.g., P(English), the overall probability value determination module 310 multiplies the message based probability value that user will respond in the specified language (e.g., P(English|messages)) by the profile based probability value that user will respond in the specified language (e.g., P(English profile)). The overall probability value determination module 310 performs this operation for each potential language, resulting in a set of overall probability values that the user will respond in each of the potential languages.

At operation 510, the language determination module 312 selects a language based on the overall probability values. The language determination module 312 selects the language based on the overall probability values calculated by the overall probability value determination module 310. For example, the language determination module 312 compares the overall probability values and selects the language that has the highest overall probability value.

Figure 6:
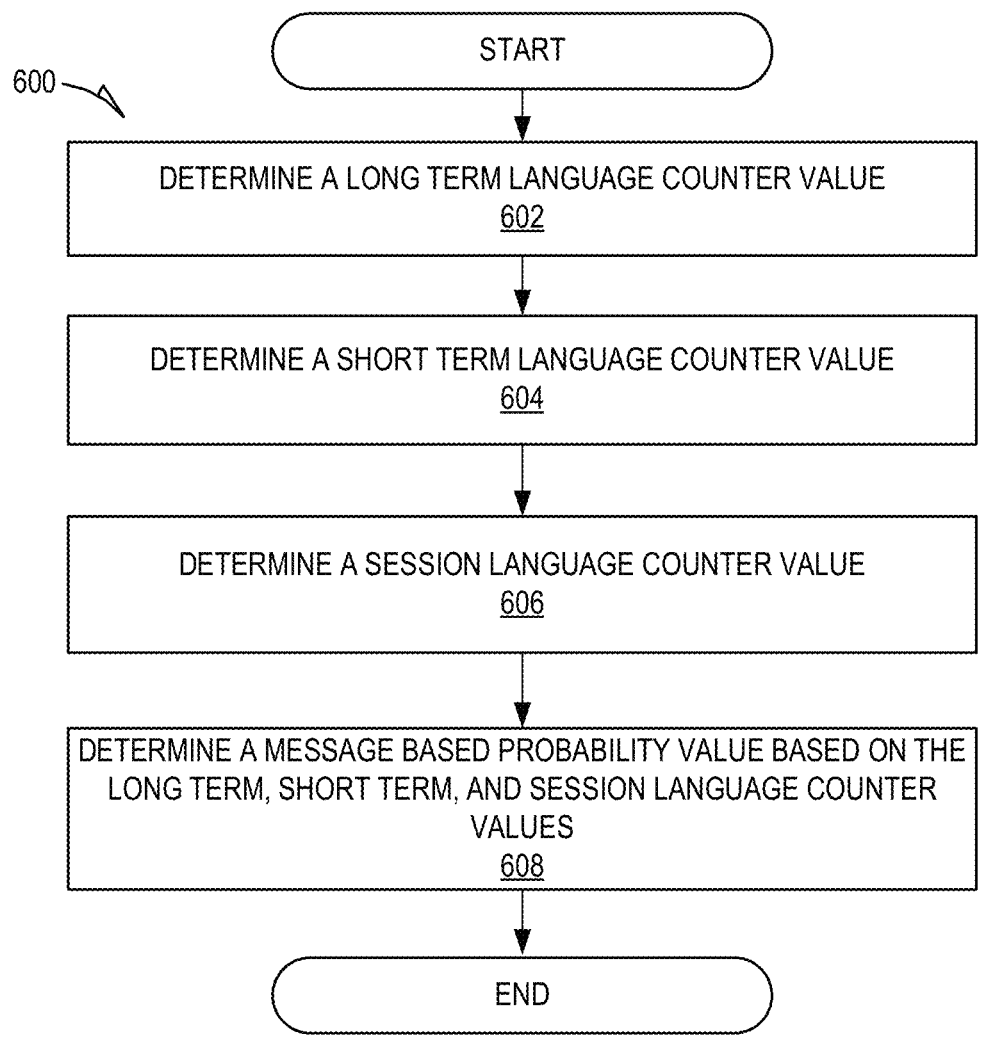
FIG. 6 is a flowchart showing an example method of generating a message based probability value, according to certain example embodiments.

FIG. 6 is a flowchart showing an example method 600 of generating a message based probability value, according to certain example embodiments. The method 600 may be embodied in computer readable instructions for execution by one or more processors such that the operations of the method 600 may be performed in part or in whole by the language classification system 110; accordingly, the method 600 is described below by way of example with reference thereto. However, it shall be appreciated that at least some of the operations of the method 600 may be deployed on various other hardware configurations and the method 600 is not intended to be limited to the language classification system 110.

At operation 602, the message based probability value determination module 306 determines a long term language counter value. The long term language counter value indicates the number of times a user used a language in previous messages during a first time period. The message based probability value determination module 306 uses a text classification model to determine the number of times that the user used the language in the previous messages. The text classification model assigns classification labels corresponding to languages to a given text, as well as probability values that the text is in the languages. The message based probability value determination module 306 determines the long term language counter value for a language based on the probability values assigned to the label corresponding to the language by the text classification model. For example, if the text classification model assigns a probability value of 75% to the text classification label for English, the message based probability value determination module 306 increments the long term counter language value for English by 0.75. The message based probability value determination module 306 determines the long term language counter value for a language based on the sum of the probability values for the language during the first period of time.

At operation 604, the message based probability value determination module 306 determines a short term language counter value. The short term language counter value is similar to the long term language counter value; however, is based on a second time period that is shorter than the first time period. For example, the first time period may be relatively longer, such as one year, whereas the second time period may be relatively shorter, such as one month. The first time period may also encompass the second time period, meaning that at least a portion of the first and second time periods overlap.

At operation 606, the message based probability value determination module 306 determines a session language counter value. A session language counter value is similar to the short term and long term language counter values; however, it is based on a variable period of time defined by the user's communication session rather than a set period of time such as one month or one year. That is, the session language counter value indicates the number of times the user used a language during the communication session.

At operation 608, the message based probability value determination module 306 determines the message based probability value based on the long term language counter value, the short term language counter value, and the session language counter value. The message based probability value determination module 306 uses the multiple language counter values to calculate the message based probability value that the user will respond to a message in the specific language. For example, the message based probability value determination module 306 uses the language counter values (e.g., short term, long term, and session) for the specific language (e.g., English) to determine a message based probability value indicating the likelihood that the user will respond to the message in the specific language (e.g., English). The message based probability value determination module 306 may apply varying weights to the language counter values (e.g., short term, long term, and session) when calculating the message based probability value. For example, the language used most recently by the user (e.g., the short term counter value and/or session counter value) may be given greater weight than the languages that the user has not used recently (e.g., long term counter value).

Figure 7:
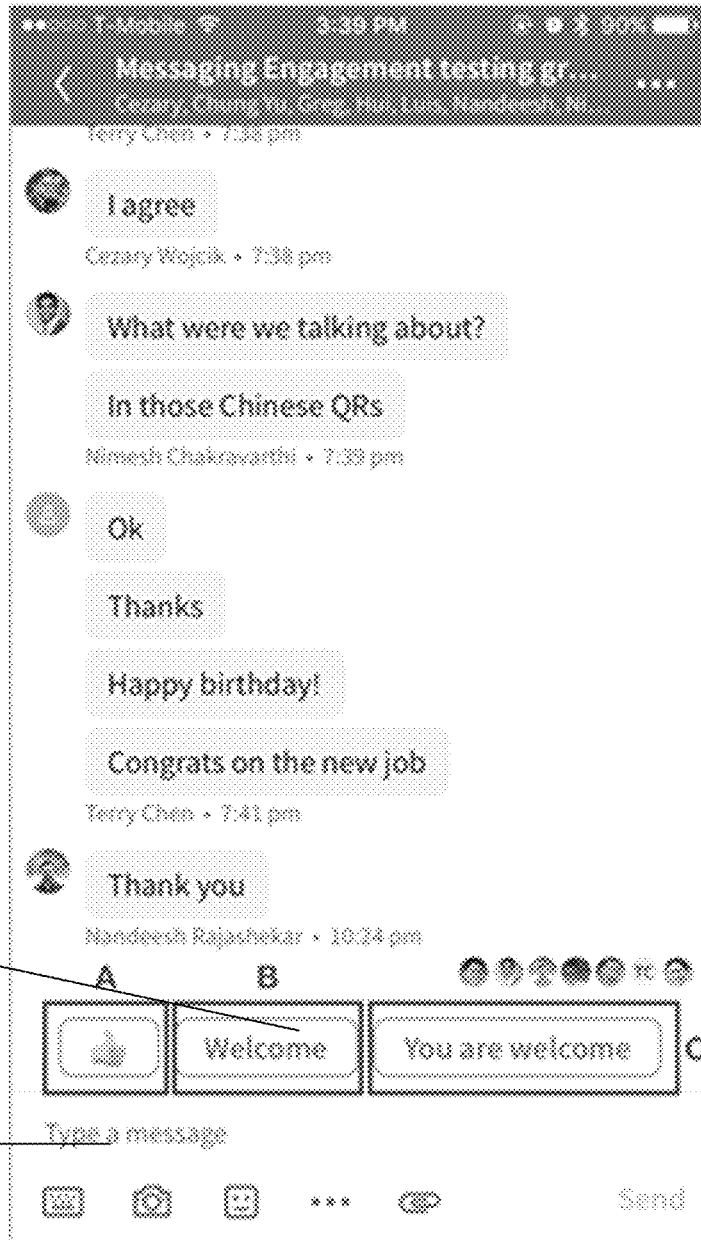
FIG. 7 is a screenshot of a messaging interface including a set of recommended response messages, according to some example embodiments.

FIG. 7 is a screenshot of a messaging interface 700 including a set of recommended response messages, according to some example embodiments. As shown, the messaging interface shows a history of messages transmitted between multiple users as part of a communication session. As shown, the most recent message received as part of the communication session is the phrase 'Thank you.' The messaging interface includes a text field 702, which a user can utilize to respond to the received message. For example, the user can select the text field 702 and enter a response such as 'you're welcome.' The messaging interface also includes a set of three recommended replies 704, which a user can select from. As shown, the recommended replies 704 include a thumbs up emoticon, 'Welcome,' and 'You are welcome.' Rather than use the text field 702 to manually type out a response, the user can select one of the recommended replies 704 with a single input to respond to the message.

Software Architecture

Figure 8:
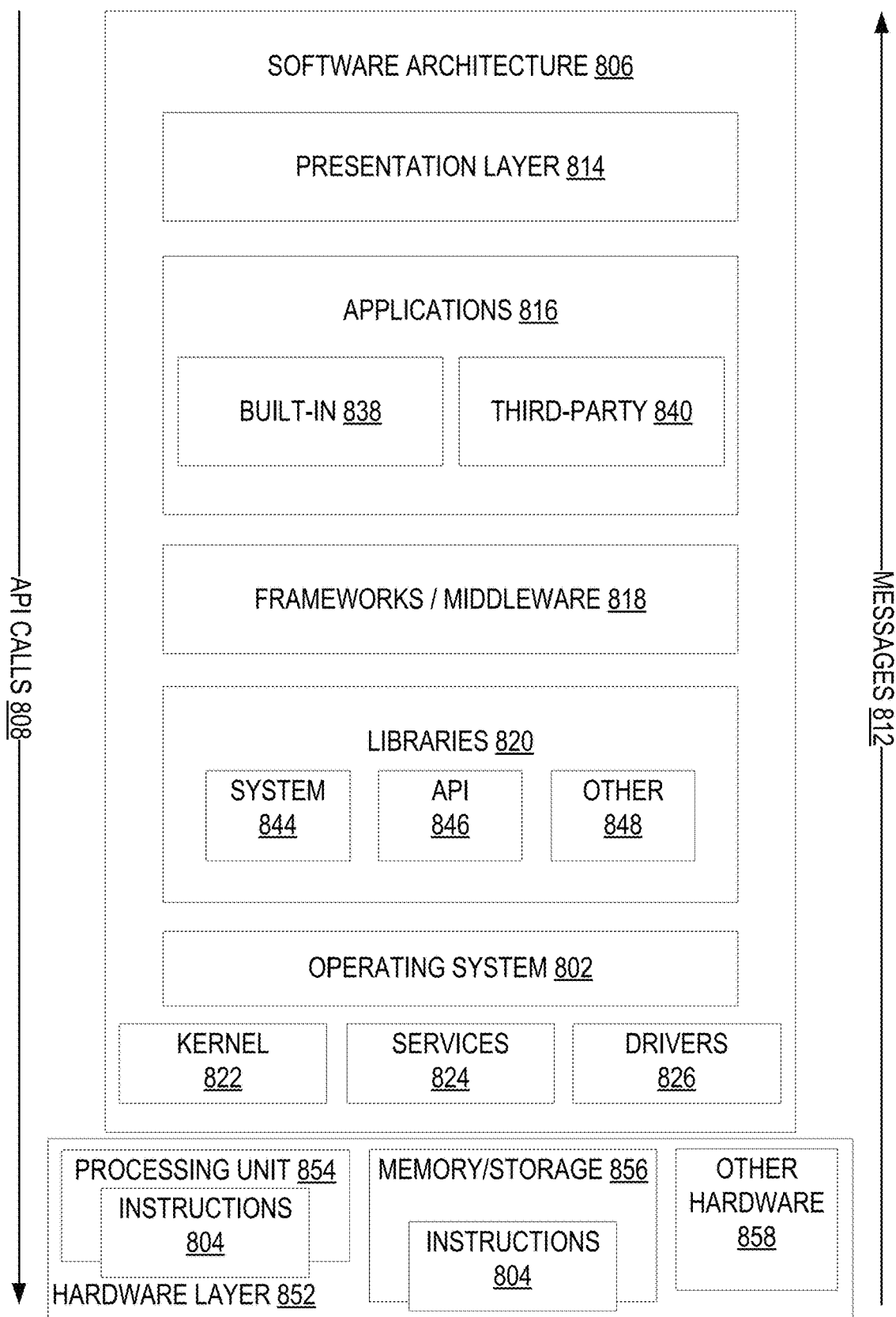
FIG. 8 is a block diagram illustrating a representative software architecture, which may be used in conjunction with various hardware architectures herein described.

FIG. 8 is a block diagram illustrating an example software architecture 806, which may be used in conjunction with various hardware architectures herein described. FIG. 8 is a non-limiting example of a software architecture 806 and it will be appreciated that many other architectures may be implemented to facilitate the functionality described herein. The software architecture 806 may execute on hardware such as machine 900 of FIG. 9 that includes, among other things, processors 904, memory 914, and (input/output) I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke Application Programming Interface (API) calls 808 through the software stack and receive a response such as messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824, and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphical user interface (GUI) functions, high-level resource management, high-level location services, and so forth. The frameworks/middleware 818 may provide a broad spectrum of other APIs that may be used by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
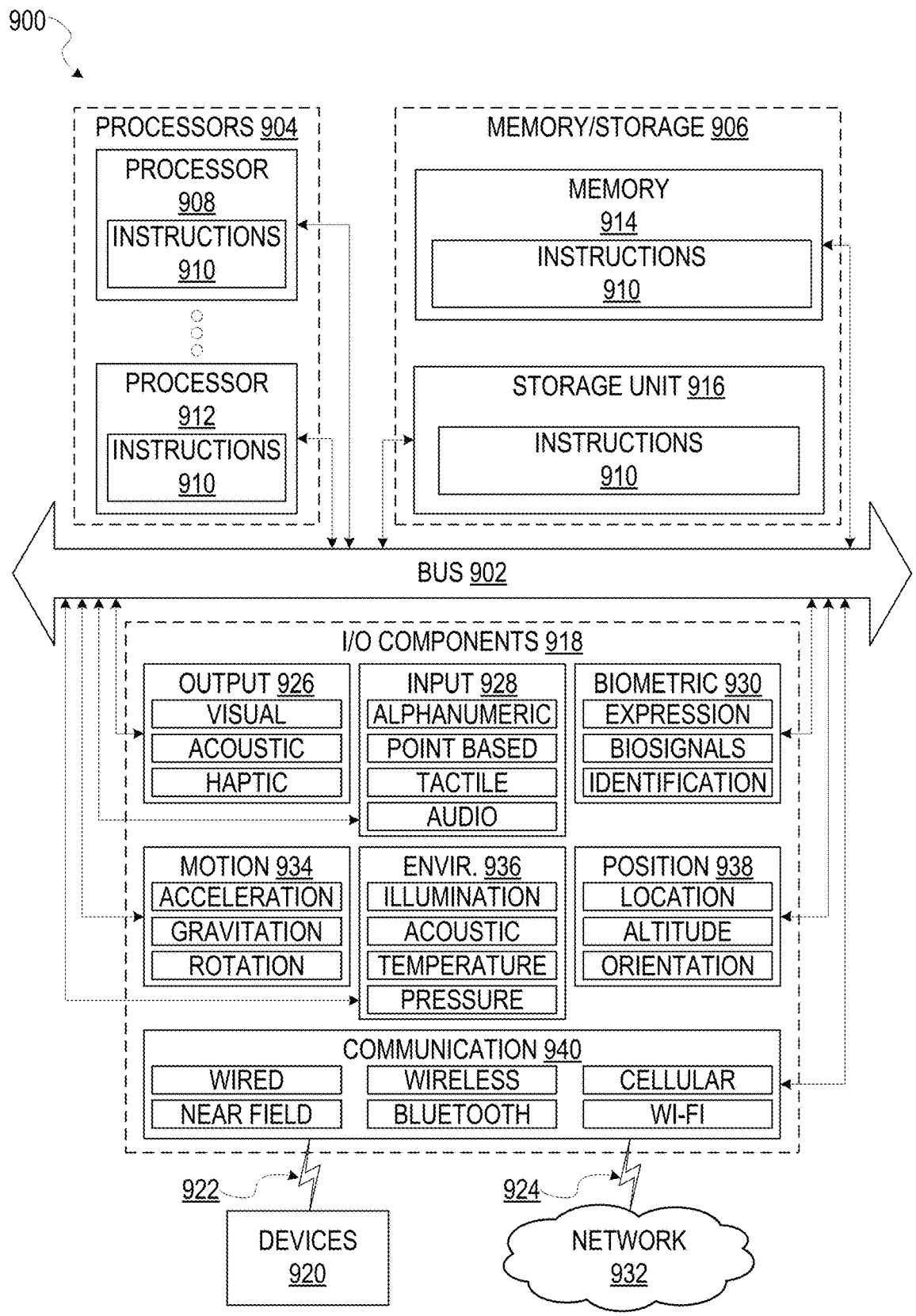
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions 804 from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 900 capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922, respectively. For example, the communication components 940 may include a network interface component or other suitable device to interface with the network 932. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 910 for execution by the machine 900, and includes digital or analog communications signals or other intangible medium to facilitate communication of such instructions 910. Instructions 910 may be transmitted or received over the network 932 using a transmission medium via a network interface device and using any one of a number of well-known transfer protocols.

"CLIENT DEVICE" in this context refers to any machine 900 that interfaces to a communications network 932 to obtain resources from one or more server systems or other client devices. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 932.

"COMMUNICATIONS NETWORK" in this context refers to one or more portions of a network 932 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 932 or a portion of a network 932 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 910 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 904) may be configured by software (e.g., an application 816 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 904 or other programmable processor 904. Once configured by such software, hardware components become specific machines 900 (or specific components of a machine 900) uniquely tailored to perform the configured functions and are no longer general-purpose processors 904. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 904 configured by software to become a special-purpose processor, the general-purpose processor 904 may be configured as respectively different special-purpose processors (e.g., comprising different hardware components) at different times. Software accordingly configures a particular processor or processors 904, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 902) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 932 (e.g., the Internet) and via one or more appropriate interfaces (e.g., an API). The performance of certain of the operations may be distributed among the processors 904, not only residing within a single machine 900, but deployed across a number of machines 900. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 900. A processor 904 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 904 (sometimes referred to as "cores") that may execute instructions 910 contemporaneously.

What is claimed is:

1. A method comprising:
   receiving, from a first client device, a message transmitted as part of a communication session between a first user associated with the first client device and a second user associated with a second client device, the first user and the second user being members of an online service that facilitates the communication session;
   determining, by using previous messages of the second user as input into a text classification model trained to determine what language is used in a given text:
   a first language counter value indicating a number of times that the second user has used the first language in previous messages during a first time period;
   a second language counter value indicating a number of times that the second user has used the first language in previous messages during a second time period, the second time period being longer than and encompassing the first time period;
   a third language counter value indicating a number of times that the second user has used a second language in previous messages during the first time period, the second language being different than the first language; and
   a fourth language counter value indicating a number of times that the second user has used the second language in previous messages during the second time period;
   calculating, based on both the first language counter value and the second language counter value, a first probability value indicating a likelihood that the second user will respond to the message in the first language, wherein calculating the first probability value comprises assigning a first weight to the first language counter and a second weight to the second language counter;
   calculating, based on both the third language counter value and the fourth language counter value, a second probability value indicating a likelihood that the second user will respond to the message in the second language, wherein calculating the second probability value comprises assigning the first weight to the third language counter and the second weight to the fourth language counter;

determining, based on the first probability value and the second probability value, that the second user will respond to the message in the first language;

determining a set of recommended responses to the message, the set of recommended responses being in the first language; and causing the set of recommended responses to be presented on the second client device.

2. The method of claim 1, wherein the text classification model assigns one or more classification labels to an input message, each of the one or more classification labels corresponding to a separate language, the text classification model assigning a probability value to each of the one or more classification labels that indicates a probability that the input text is in the separate language corresponding to the respective classification label.

3. The method of claim 1, further comprising:
for each determined instance of the second user having used the first language in previous messages during the first time period, determining a numerical value for the respective determined instance based on a probability value assigned to the determined instance by the classification model, yielding a first set of determined numerical values; and
determining the first language counter value based on the first set of determined numerical values.

4. The method of claim 1, wherein calculating the first probability comprises:
determining, based on the first language counter value, a message based probability value that the second user will respond to the message in the first language;
determining, based on demographic data of the second user, a profile based probability value that the second user will respond to the message in the first language; and
determining the first probability value based on the message based probability value and the profile based probability value.

5. The method of claim 1, further comprising:
filtering the previous messages with a bloom filter to remove duplicate messages.

6. A system comprising:
one or more computer processors; and
one or more computer-readable mediums storing instructions that, when executed by the one or more computer processors, cause the system to perform operations comprising:
receiving, from a first client device, a message transmitted as part of a communication session between a first user associated with the first client device and a second user associated with a second client device, the first user and the second user being members of an online service that facilitates the communication session;
determining, by using previous messages of the second user as input into a text classification model trained to determine what language is used in a given text:
a first language counter value indicating a number of times that the second user has used the first language in previous messages during a first time period;
a second language counter value indicating a number of times that the second user has used the first language in previous messages during a second time period, the second time period being longer than and encompassing the first time period;
a third language counter value indicating a number of times that the second user has used a second language in previous messages during the first time period, the second language being different than the first language; and
a fourth language counter value indicating a number of times that the second user has used the second language in previous messages during the second time period;
calculating, based on both the first language counter value and the second language counter value, a first probability value indicating a likelihood that the second user will respond to the message in the first language wherein calculating the first probability value comprises assigning a first weight to the first language counter and a second weight to the second language counter;
calculating, based on both the third language counter value and the fourth language counter value, a second probability value indicating a likelihood that the second user will respond to the message in the second language, wherein calculating the second probability value comprises assigning the first weight to the third language counter and the second weight to the fourth language counter;
determining, based on the first probability value and the second probability value, that the second user will respond to the message in the first language;
determining a set of recommended responses to the message, the set of recommended responses being in the first language; and
causing the set of recommended responses to be presented on the second client device.

7. The system of claim 6, wherein the text classification model assigns one or more classification labels to an input message, each of the one or more classification labels corresponding to a separate language, the text classification model assigning a probability value to each of the one or more classification labels that indicates a probability that the input text is in the separate language corresponding to the respective classification label.

8. The system of claim 6, the operations further comprising:
for each determined instance of the second user having used the first language in previous messages during the first time period, determining a numerical value for the respective determined instance based on a probability value assigned to the determined instance by the classification model, yielding a first set of determined numerical values; and
determining the first language counter value based on the first set of determined numerical values.

9. The system of claim 6, wherein calculating the first probability comprises:
determining, based on the first language counter value, a message based probability value that the second user will respond to the message in the first language;
determining, based on demographic data of the second user, a profile based probability value that the second user will respond to the message in the first language; and
determining the first probability value based on the message based probability value and the profile based probability value.

10. The system of claim 6, the operations further comprising:
  filtering the previous messages with a bloom filter to remove duplicate messages.

11. A non-transitory computer-readable medium storing instructions that, when executed by one or more computer processors of a computing system, cause the computing system to perform operations comprising:
  receiving, from a first client device, a message transmitted as part of a communication session between a first user associated with the first client device and a second user associated with a second client device, the first user and the second user being members of an online service that facilitates the communication session;
  determining, by using previous messages of the second user as input into a text classification model trained to determine what language is used in a given text:
  a first language counter value indicating a number of times that the second user has used the first language in previous messages during a first time period;
  a second language counter value indicating a number of times that the second user has used the first language in previous messages during a second time period, the second time period being longer than and encompassing the first time period;
  a third language counter value indicating a number of times that the second user has used a second language in previous messages during the first time period, the second language being different than the first language; and
  a fourth language counter value indicating a number of times that the second user has used the second language in previous messages during the second time period;
  calculating, based on both the first language counter value and the second language counter value, a first probability value indicating a likelihood that the second user will respond to the message in the first language, wherein calculating the first probability value comprises assigning a first weight to the first language counter and a second weight to the second language counter;
  calculating, based on both the third language counter value and the fourth language counter value, a second probability value indicating a likelihood that the second user will respond to the message in the second language, wherein calculating the second probability value comprises assigning the first weight to the third language counter and the second weight to the fourth language counter;
  determining, based on the first probability value and the second probability value, that the second user will respond to the message in the first language;
  determining a set of recommended responses to the message, the set of recommended responses being in the first language; and
  causing the set of recommended responses to be presented on the second client device.

12. The non-transitory computer-readable medium of claim 11, wherein the text classification model assigns one or more classification labels to an input message, each of the one or more classification labels corresponding to a separate language; the text classification model assigning a probability value to each of the one or more classification labels that indicates a probability that the input text is in the separate language corresponding to the respective classification label.

13. The non-transitory computer-readable medium of claim 6, the operations further comprising:
  for each determined instance of the second user having used the first language in previous messages during the first time period, determining a numerical value for the respective determined instance based on a probability value assigned to the determined instance by the classification model, yielding a first set of determined numerical values; and
  determining the first language counter value based on the first set of determined numerical values.

14. The non-transitory computer-readable medium of claim 11, wherein calculating the first probability comprises:
  determining, based on the first language counter value, a message based probability value that the second user will respond to the message in the first language;
  determining, based on demographic data of the second user, a profile based probability value that the second user will respond to the message in the first language; and
  determining the first probability value based on the message based probability value and the profile based probability value.

* * * * *

UNITED STATES PATENT AND TRADEMARK OFFICE
CERTIFICATE OF CORRECTION

| | | |
|---|---|---|
| PATENT NO. | : 10,867,130 B2 | Page 1 of 1 |
| APPLICATION NO. | : 15/994922 | |
| DATED | : December 15, 2020 | |
| INVENTOR(S) | : Pasternack | |

It is certified that error appears in the above-identified patent and that said Letters Patent is hereby corrected as shown below:

In the Claims

Column 26, Line 15, Claim 6, delete "language" and insert --language,-- therefor Column 28, Line 17, Claim 12, delete "language;" and insert --language,-- therefor Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*